United States Patent
Fujimoto et al.

(10) Patent No.: US 11,366,435 B2
(45) Date of Patent: Jun. 21, 2022

(54) PLANT CONTROL DEVICE THAT CORRECTS FOR MODELING ERROR AND PERIODIC DISTURBANCES

(71) Applicants: Nidec Corporation, Kyoto (JP); The University of Tokyo, Tokyo (JP)

(72) Inventors: Hiroshi Fujimoto, Tokyo (JP); Linfeng Lan, Kyoto (JP); Tomonari Mori, Kyoto (JP); Masanori Watahiki, Kyoto (JP)

(73) Assignees: NIDEC CORPORATION, Kyoto (JP); THE UNIVERSITY OF TOKYO, Tokyo (JP)

(*) Notice: Subject to any disclaimer, the term of this patent is extended or adjusted under 35 U.S.C. 154(b) by 329 days.

(21) Appl. No.: 16/608,291

(22) PCT Filed: Apr. 4, 2018

(86) PCT No.: PCT/JP2018/014374
§ 371 (c)(1),
(2) Date: Oct. 25, 2019

(87) PCT Pub. No.: WO2018/198694
PCT Pub. Date: Nov. 1, 2018

(65) Prior Publication Data
US 2021/0103258 A1    Apr. 8, 2021

(30) Foreign Application Priority Data
Apr. 27, 2017   (JP) .............................. JP2017-088414

(51) Int. Cl.
G05B 13/04    (2006.01)
G05B 11/32    (2006.01)
H02P 21/05    (2006.01)

(52) U.S. Cl.
CPC ............ *G05B 13/048* (2013.01); *G05B 11/32* (2013.01); *H02P 21/05* (2013.01)

(58) Field of Classification Search
None
See application file for complete search history.

(56) References Cited

U.S. PATENT DOCUMENTS

2005/0207057 A1*  9/2005  Atsumi ................ G11B 5/5547
                                                         360/78.09
2011/0046795 A1*  2/2011  Fujimoto ................ G03F 7/709
                                                         700/280
(Continued)

FOREIGN PATENT DOCUMENTS

| JP | 03-235687 A | 10/1991 |
| JP | 2010-272686 A | 12/2010 |
| JP | 2011-050119 A | 3/2011 |

OTHER PUBLICATIONS

Nakai et al. 'Harmonic Current Suppression Method of PMSM Based on Repetitive Perfect Tracking Control' The 33rd Annual Conference of the IEEE Industrial Electronics Society (IECON) Nov. 5-8, 2007, Taipei, Taiwan, IEEE 2007.*

(Continued)

*Primary Examiner* — Bernard G Lindsay
(74) *Attorney, Agent, or Firm* — Keating & Bennett

(57) ABSTRACT

A control device to perform feedback control based on a current value, and output a first voltage value includes a feedforward controller using an inverse model of a plant; a feedforward voltage corrector to correct a voltage disturbance due to a modeling error between the plant and a model of the plant; a repetitive controller to learn periodic current disturbances; and a switch. The switch is ON when the current response is in a steady state, and the repetitive controller learns the disturbances and corrects a command current value. A feedback controller outputs the first voltage (Continued)

value by performing the feedback control based on a current value from the corrected command current value, and inputs the command current value to the inverse model to generate a second voltage value. The control device outputs a sum of the first and the second voltage value as a command voltage value.

15 Claims, 9 Drawing Sheets

(56) References Cited

U.S. PATENT DOCUMENTS

| | | | |
|---|---|---|---|
| 2016/0028340 A1* | 1/2016 | Nakai | H02P 21/05 318/400.02 |
| 2018/0267486 A1* | 9/2018 | Manabe | G05B 13/024 |
| 2019/0252972 A1* | 8/2019 | Minaki | H02M 1/38 |

OTHER PUBLICATIONS

Nakai et al. 'Harmonic Current Suppression Method of SPM Motor Based on Repetitive Perfect Tracking Control with Speed Variation' 2008 34th Annual Conference of IEEE Industrial Electronics, pp. 1210-1215. IEEE, 2008.*

Official Communication issued in International Patent Application No. PCT/JP2018/014374, dated Jul. 10, 2018.

Nakai et al., "Harmonic Current Suppression of PM Motor by Repetitive Perfect Tracking Control ~ Comparison between dq cordinate model and αβ cordinate model ~", pp. 1-6.

* cited by examiner

FIG.5

$$\begin{bmatrix} v_\alpha \\ v_\beta \end{bmatrix} =$$

$$\left\{ \omega \begin{bmatrix} -L_2\sin(2\theta+\theta_{L2})-2M_2\sin(2\theta+\theta_{M2}) & L_2\cos(2\theta+\theta_{L2})+2M_2\cos(2\theta+\theta_{M2}) \\ L_2\cos(2\theta+\theta_{L2})+2M_2\cos(2\theta+\theta_{M2}) & L_2\sin(2\theta+\theta_{L2})+2M_2\sin(2\theta+\theta_{M2}) \end{bmatrix} \begin{bmatrix} i_\alpha \\ i_\beta \end{bmatrix} \right.$$

$$\left. + \begin{bmatrix} L_0\cos\theta_{L0}-M_0\cos\theta_{M0}+\dfrac{L_2}{2}\cos(2\theta+\theta_{L2})+M_2\cos(2\theta+\theta_{M2}) & \dfrac{L_2}{2}\sin(2\theta+\theta_{L2})+M_2\sin(2\theta+\theta_{M2}) \\ \dfrac{L_2}{2}\sin(2\theta+\theta_{L2})+M_2\sin(2\theta+\theta_{M2}) & L_0\cos\theta_{L0}-M_0\cos\theta_{M0}-\dfrac{L_2}{2}\cos(2\theta+\theta_{L2})-M_2\cos(2\theta+\theta_{M2}) \end{bmatrix} \dfrac{d}{dt}\begin{bmatrix} i_\alpha \\ i_\beta \end{bmatrix} \right\} \cdots (b)$$

$$(a)\begin{cases} +\sqrt{\dfrac{3}{2}}\omega\begin{bmatrix} -\Psi_{m1}\sin(\theta+\theta_{m1}) \\ \Psi_{m1}\cos(\theta+\theta_{m1}) \end{bmatrix} \cdots (a1) \\ +\omega\begin{bmatrix} A'_{11} & A'_{12} \\ A'_{21} & A'_{22} \end{bmatrix}\begin{bmatrix} i_\alpha \\ i_\beta \end{bmatrix} + \begin{bmatrix} B'_{11} & B'_{12} \\ B'_{21} & B'_{22} \end{bmatrix}\left(\dfrac{d}{dt}\begin{bmatrix} i_\alpha \\ i_\beta \end{bmatrix}\right) + \omega\begin{bmatrix} D'_1 \\ D'_2 \end{bmatrix} \cdots (a2) \end{cases}$$

*FIG.6*

$$\begin{bmatrix} v_d \\ v_q \end{bmatrix} = R \begin{bmatrix} i_d \\ i_q \end{bmatrix}$$

$$+ \omega \begin{bmatrix} -\frac{L_2}{2}\sin(\theta_{L2}) - M_2\sin(\theta_{M2}) & -L_0\cos(\theta_{L0}) + M_0\cos(\theta_{M0}) + \frac{L_2}{2}\cos(\theta_{L2}) + M_2\cos(\theta_{M2}) \\ L_0\cos(\theta_{L0}) - M_0\cos(\theta_{M0}) + \frac{L_2}{2}\cos(\theta_{L2}) + M_2\cos(\theta_{M2}) & \frac{L_2}{2}\sin(\theta_{L2}) + M_2\sin(\theta_{M2}) \end{bmatrix} \begin{bmatrix} i_d \\ i_q \end{bmatrix} \quad (d1)$$

$$+ \begin{bmatrix} L_0\cos(\theta_{L0}) - M_0\cos(\theta_{M0}) + \frac{L_2}{2}\cos(\theta_{L2}) + M_2\cos(\theta_{M2}) & \frac{L_2}{2}\sin(\theta_{L2}) + M_2\sin(\theta_{M2}) \\ \frac{L_2}{2}\sin(\theta_{L2}) + M_2\sin(\theta_{M2}) & L_0\cos(\theta_{L0}) - M_0\cos(\theta_{M0}) - \frac{L_2}{2}\cos(\theta_{L2}) - M_2\cos(\theta_{M2}) \end{bmatrix} \frac{d}{dt}\begin{bmatrix} i_d \\ i_q \end{bmatrix} \quad (d2)$$

$$+ \sqrt{\frac{3}{2}}\omega \begin{bmatrix} -\Psi_{m1}\sin(\theta_{m1}) \\ \Psi_{m1}\cos(\theta_{m1}) \end{bmatrix}$$

$$+ \omega \begin{bmatrix} A'_{11} & A'_{12} \\ A'_{21} & A'_{22} \end{bmatrix} \begin{bmatrix} i_d \\ i_q \end{bmatrix} + \begin{bmatrix} B'_{11} & B'_{12} \\ B'_{21} & B'_{22} \end{bmatrix} \frac{d}{dt}\begin{bmatrix} i_d \\ i_q \end{bmatrix} + \omega \begin{bmatrix} D'_1 \\ D'_2 \end{bmatrix}$$

(d)

(c)

660 a

660

PLANT CONTROL DEVICE THAT CORRECTS FOR MODELING ERROR AND PERIODIC DISTURBANCES

CROSS REFERENCE TO RELATED APPLICATIONS

This is a U.S. national stage of PCT Application No. PCT/JP2018/014374, filed on Apr. 4, 2018, and priority under 35 U.S.C. § 119(a) and 35 U.S.C. § 365(b) is claimed from Japanese Application No. 2017-088414, filed Apr. 27, 2017; the entire disclosures of each of which are hereby incorporated herein by reference.

1. FIELD OF THE INVENTION

The present disclosure relates to a control device that outputs a command voltage value.

2. BACKGROUND

One cause for the vibration and noise of a motor is that an electromagnetic excitation force which is generated in a radial direction of the motor induces vibration of the stator. The electromagnetic excitation force in a radial direction, which is referred to as a "radial force", occurs between the rotor and each tooth of the stator. In a radial force, a plurality of order-components (harmonic components) exist that vibrate with different temporal periods in response to rotor rotation.

In order to reduce such vibrations, studies are under way to create an electromagnetic force with an electric current, this electromagnetic force having an inverse phase to the periodic vibrations. The current with which to reduce the vibrations is a harmonic current. The current to flow in the motor needs to track a harmonic current command with a good precision.

Conventional research and development has been directed to controlling the current based on feedback control. However, due to the characteristics of feedback and the internal model principle, it has been found to be difficult to realize tracking control for harmonic currents with the conventional feedback alone.

For example, a research paper by Takahiro NAKAI et al., "Harmonic current suppression for PMSM by repetitive perfect tracking control" discloses a technique for controlling harmonic currents by using repetitive perfect tracking control, which is an improved version of perfect tracking control (hereinafter referred to as "PTC"). This paper reports that by correcting a model error in the time domain of PTC, harmonic currents occurring in a permanent magnet synchronous motor (i.e., PMSM) have successfully been suppressed.

SUMMARY

According to a study by the inventors, since a harmonic current is a spatial model error, even if the model error in the time domain of PTC is corrected with the technique of the paper, there still remains some model error. Further reduction in the model error is desired.

The technique of allowing a current to track a harmonic current command with a good precision can also be utilized for purposes other than reducing motor vibrations. An example embodiment of the present disclosure provides a control technique of allowing a current to track a harmonic current command with a better precision, by improving on model errors.

In an illustrative example embodiment, a control device according to the present disclosure is a control device that outputs a command voltage value and includes a feedback controller to perform feedback control based on a current value, and output a first voltage value; a feedforward controller established by using an inverse model of a plant as a controlled object; a feedforward voltage corrector to correct a voltage disturbance that occurs due to a modeling error between a plant model and the actual plant; a repetitive controller to learn periodic current disturbances; and a switch to control input/output to the repetitive controller. The switch is turned ON when current response is in a steady state; the repetitive controller learns the current disturbances and corrects a command current value; the feedback controller outputs the first voltage value by performing the feedback control based on a current value that is acquired from the corrected command current value; the feedforward controller inputs the corrected command current value to the inverse model to generate a second voltage value; and a sum of the first voltage value and the second voltage value is output as the command voltage value.

An example embodiment of the present disclosure makes possible a control that allows a current to track a harmonic current command with a better precision, by improving on model errors.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 5 is a diagram showing a difference term including two kinds of voltage disturbances (a) and (b).

FIG. 6 is a diagram showing a voltage equation for the dq reference frame and voltage disturbances that are contained in the voltage equation.

DETAILED DESCRIPTION

Hereinafter, with reference to the attached drawings, example embodiments of control devices according to the present disclosure and control systems including such control devices will be described. In the present specification, a motor control system that includes a motor will be mainly described. However, the motor control system is a non-limiting, illustrative example embodiment of a control system according to the present disclosure. As will be described later, a control system according to the present disclosure can also be utilized for purposes other than controlling motor rotation.

Figure 1:
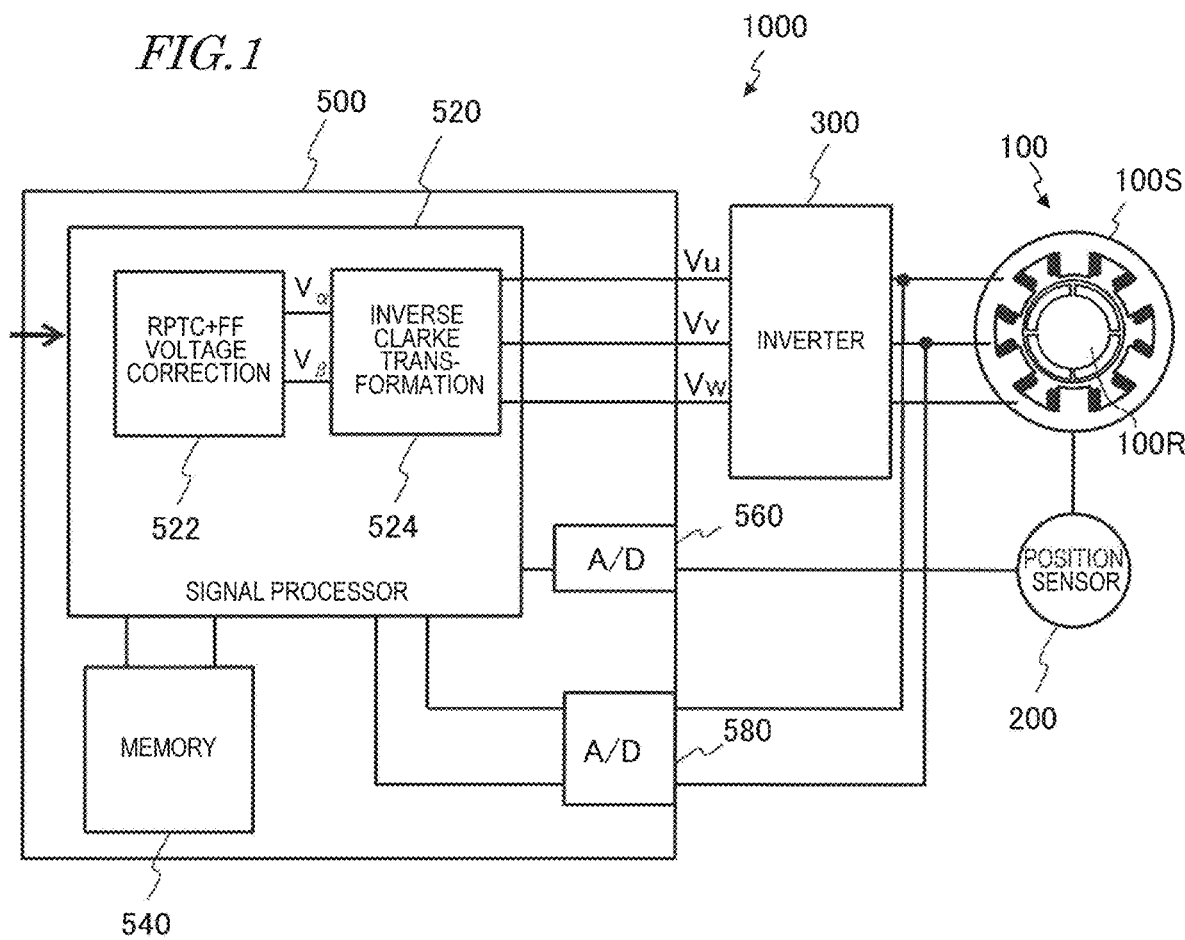
FIG. 1 is a diagram schematically showing a motor control system 1000 according to an illustrative example embodiment of the present disclosure.

FIG. 1 is a diagram schematically showing the constitution of a motor control system 1000 according to the present example embodiment. In the illustrated example, the motor control system 1000 of the present example embodiment includes: a permanent magnet synchronous motor 100 having a rotor 100R and a stator 100S; a position sensor 200 for measuring or estimating the position of the rotor 100R; an inverter 300; and a motor control device 500 which controls the permanent magnet synchronous motor 100.

The constitution of the permanent magnet synchronous motor 100 is not particularly limited. It may be a surface permanent magnetic motor (SPM) in which permanent magnets are incorporated on the surface of the rotor 100R, or an interior permanent magnetic motor (IPM) in which permanent magnets are incorporated in the interior of the rotor 100R. Alternatively, it may be a motor in which permanent magnets are retained in the interior of the stator. Moreover, the coils of the stator 100S are not limited to concentrated winding, but may distributed winding may instead be used. Typical examples of the position sensor 200 are magnetic sensors such as a Hall generator or a Hall IC, a rotary encoder, and a resolver. The position sensor 200 is not indispensable; a constitution where the position of the rotor 100R is estimated sensorlessly may also be adopted.

The inverter 300 receives a command voltage value (Vu, Vv, Vw) from the control device 500. The inverter 300 applies a U-phase voltage u, a V-phase voltage v, and a W-phase voltage w that are based on the command voltage value to a U-phase coil, a V-phase coil, and a W-phase coil, respectively, of the permanent magnet synchronous motor 100, thus flowing desired currents in the coils of the respective phases.

In front of the inverter 300, a circuit for generating PWM signals based on the command voltage value (Vu, Vv, Vw), and a gate driver for generating gate driving signals for switching transistors within the inverter 300 on the basis of the PWM signals may be provided. These elements are known, and omitted from illustration for simplicity.

The control device 500 includes a signal processor 520 and a memory 540. The memory 540 stores a program for causing the signal processor 520 to execute the below-described process.

The control device 500 includes: an A/D converter 560 which converts an analog signal from the position sensor 200 into a digital signal; and an A/D converter 580 which converts an analog signal from a sensor (not shown) that detects a current flowing in a coil of the motor 100 into a digital signal.

The control device 500 outputs the command voltage value (Vu, Vv, Vw) to be supplied to the inverter 300. In outline, the processing by the control device 500 is as follows. The signal processor 520 of the control device 500 includes two computation blocks 522 and 524. The computation block 522 performs: a computation based on a repetitive perfect tracking control model which involves feedforward voltage corrections; and a computation of calculating voltage values $V_\alpha$ and $V_\beta$ in the $\alpha\beta$ reference frame. The computation block 524 performs a computation of applying an inverse Clarke transformation to the voltage values $V_\alpha$ and $V_\beta$ in the $\alpha\beta$ reference frame to generate the command voltage value (Vu, Vv, Vw).

The computation blocks 522 and/or 524 may be implemented as special-purpose arithmetic circuits (hardware). Alternatively, the computation blocks 522 and/or 524 may be realized in software. In the latter case, one or more computer programs describing instructions for causing the computations in the computation blocks 522 and/or 524 to be performed are stored in the memory 540, for example, and the signal processor 520 executes this computer program. As a result, the signal processor 520 functions as the computation blocks 522 and/or 524.

Note that a part or a whole of the inverter 300 may be included in the control device 500. Such a control device 500 is typically realized by connecting one or more semiconductor chips to one another within a single package. A part or a whole of the control device 500 may be realized by writing a program that is specific to the present disclosure to a general-purpose microcontroller unit (MCU), for example.

Hereinafter, the computation block 522 of the control device 500 will be described in detail. Note that specific processes by the computation block 524 are known, and the description thereof is omitted.

Figure 2:
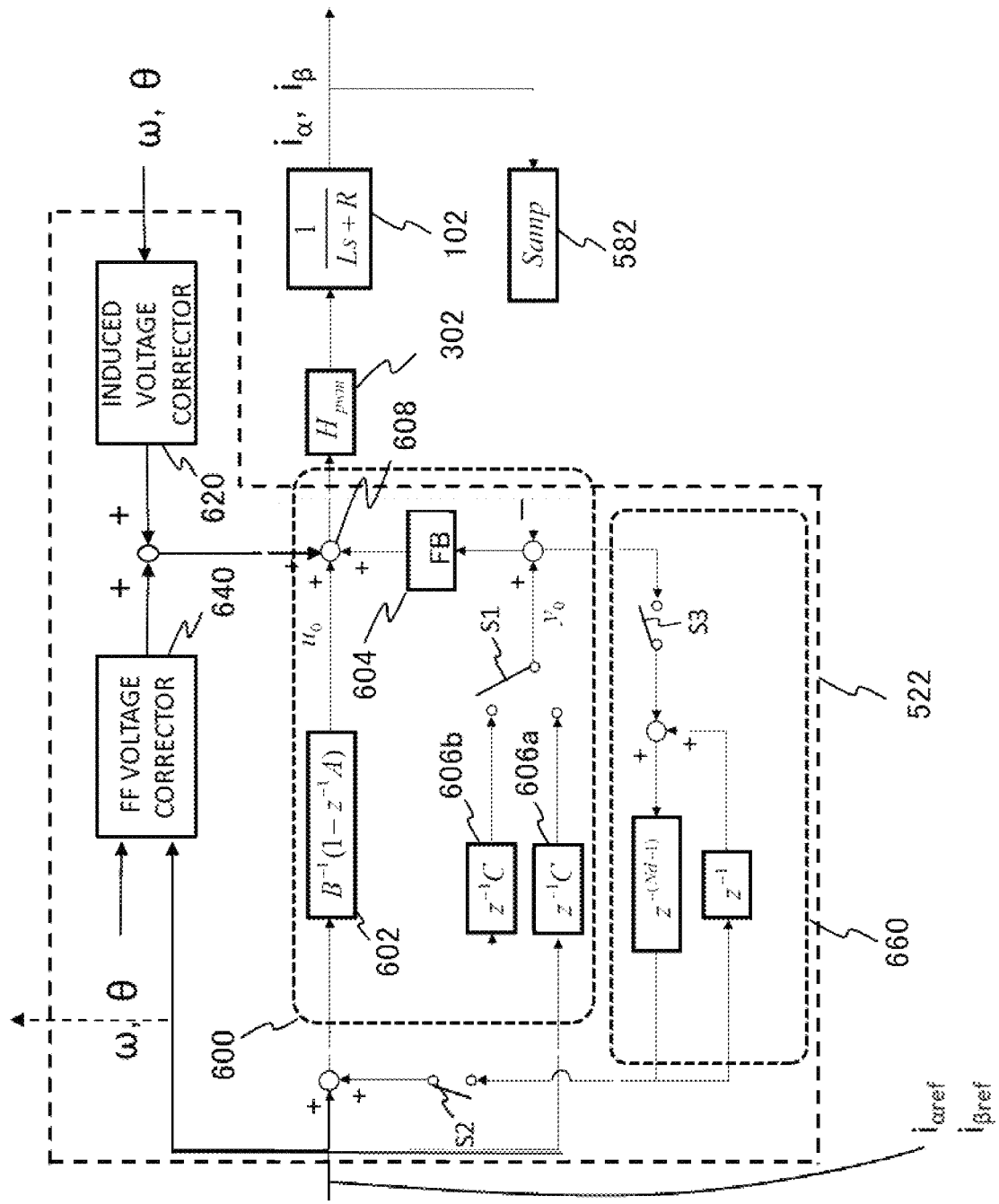
FIG. 2 is a block diagram mainly showing a processing model of a computation block 522.

FIG. 2 is a block diagram mainly showing a processing model of the computation block 522. In addition to the computation block 522, FIG. 2 shows a PWM hold 302, as well as a plant 102 as a controlled object and a sampler 582. The PWM hold 302 corresponds to the inverter 300; the plant 102 corresponds to the motor 100; and the sampler 582 corresponds to the A/D converter 580.

Before describing the computation block 522 in detail, a model of the motor 100 to be controlled will be described first.

1. Motor Model Involving Induced Voltage Correction

An $\alpha\beta$ reference frame model and a dq reference frame model are known as motor models. While the dq reference frame model is frequently used in vector control, the present example embodiment adopts the $\alpha\beta$ reference frame model. One reason for this is in order to avoid errors in coordinate transformation between samplings. Errors in coordinate transformation arise from changes in electrical angle. Whereas the electrical angle used in coordinate transformation has a constant value because of being subjected to zero-order hold between samplings, the actual electrical angle fluctuates between samplings. Because of the difference between the electrical angle under zero-order hold and the actual electrical angle, an error in coordinate transformation arises. Therefore, the $\alpha\beta$ reference frame model will be used in connection with PTC.

A voltage equation in $\alpha\beta$ coordinates of the motor 100 according to the present example embodiment is shown in eq. (1).

[math. 1]
$$\begin{bmatrix} V_\alpha \\ V_\beta \end{bmatrix} = \begin{bmatrix} R+Ls & 0 \\ 0 & R+Ls \end{bmatrix} \begin{bmatrix} i_\alpha \\ i_\beta \end{bmatrix} + \omega K_e \begin{bmatrix} -\sin\theta \\ \cos\theta \end{bmatrix} \quad (1)$$

In eq. (1), $V_\alpha$, $V_\beta$, $i_\alpha$, and $i_\beta$ represent an $\alpha$-axis voltage, a $\beta$-axis voltage, an $\alpha$-axis current, and a $\beta$-axis current, respectively. Moreover, R and L represent a coil resistance and an inductance of the motor 100. $\omega$ and $\theta$ represent an electrical angular rate and an electrical angle. $K_e$ represents an induced voltage constant.

To eq. (1), induced voltage correction is applied as indicated in eq. (2) and eq. (3) below.

[math. 2]

$$V_\alpha = V_\alpha' - \omega K_e \sin\theta \qquad (2)$$

$$V_\beta = V_\beta' + \omega K_e \cos\theta \qquad (3)$$

By applying the voltages shown on the right-hand side of eq. (2) and eq. (3) as $V_\alpha$ and $V_\beta$, the induced voltage term, i.e., the second term on the right-hand side, of eq. (1) is canceled. Such correction of induced voltage may be referred to as noninteracting control.

Now, given a state variable x which is current $i_\alpha$ or $i_\beta$, and an input u which is $V_\alpha'$ or $V_\beta'$, it is possible to express eq. (1) which has undergone induced voltage correction as eq. (4) below.

[math. 3]

$$\dot{x} = A_c x(t) + B_c u(t),\ y(t) = C_c x(t) \qquad (4)$$

Herein, $A_c = -(R/L)$, $B_c = 1/L$, $C_c = 1$. The current is or is to flow in the motor is an output y.

Although the process for correcting the induced voltage is actually to be performed in the computation block 522, it has been mentioned in this section for convenience of explanation.

2. Discretization Based on PWM Hold

In order to control the motor 100 by using a computer, a continuous-time system control model of the motor 100 is changed into a discrete-time system control model.

Figure 3A:
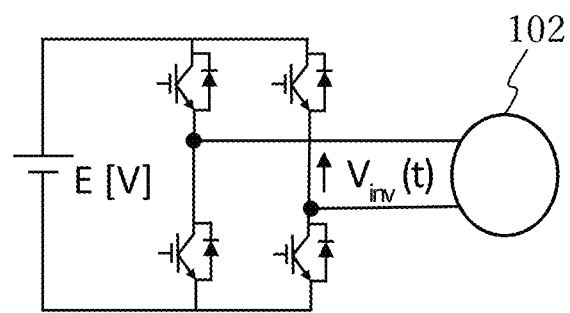
FIG. 3A is a schematic circuit diagram of a single-phase inverter that is connected to a motor of a plant 102.
Figure 3B:
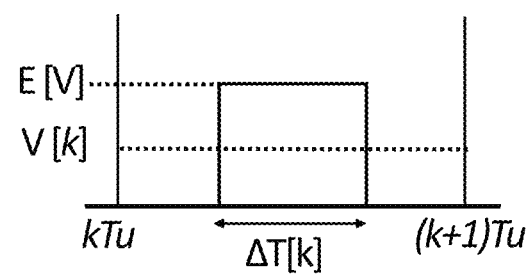
FIG. 3B shows an exemplary output voltage of a PWM hold controlling a pulse width $\Delta T[k]$.

FIG. 3A is a schematic circuit diagram of a single-phase inverter that is connected to a motor being the plant 102. A single-phase inverter cannot output any arbitrary output voltage V(k), but only outputs two values of either 0 or ±E(V). "E" is the DC power voltage for the single-phase inverter. The present example embodiment will regard such a single-phase inverter as the PWM hold 302, and consider controlling the pulse width thereof. FIG. 3B shows an exemplary output voltage of the PWM hold controlling the pulse width ΔT[k]. Since the method of discretization based on PWM hold is known, any more specific description will be omitted. See, for example, Atsuo KAWAMURA, "Gendai Power Electronics (or "Modern Power Electronics"), (SUURIKOUGAKUSHA-SHA Co., Ltd. (2005)).

As a method of discretization for a model to be controlled, zero-order hold is known. Zero-order hold functions to output an immediately previous value for a certain period of time. Zero-order hold cannot be considered sufficient for accurately controlling an instantaneous value. Accordingly, the inventors have thought that it would be preferable to discretize the motor model based on PWM hold.

By using eq. (4), which is a model of the motor 100 to be controlled, a state equation of the discrete-time system as indicated in eq. (5) below is obtained, with the switching time ΔT[k] as a control input. It is assumed that the PWM hold outputs −E[V] when ΔT[k] is negative.

[math. 4]

$$x(k+1) = Ax(k) + B\Delta T(k),\ y(k) = Cx(k) \qquad (5)$$

Herein, when a PWM period Tu is given, $A = \exp(A_c T_u)$, $B = \exp(A_c T_u/2) B_c E$, $C = C_c$. In the case where the motor control system 1000 is battery-driven, E is the battery voltage.

3. Details of Computation Block 522

Next, the computation block 522 will be described in detail.

The computation block 522 includes a PTC block 600, an induced voltage corrector 620, a feedforward (FF) voltage corrector 640, and a repetitive controller 660. Among these, the induced voltage corrector 620 retains an induced voltage constant $K_e$, and performs the process described with eqs. (2) and (3). In other words, the induced voltage corrector 620 receives an electrical angular rate ω and an electrical angle θ, generates "$-\omega \cdot K_e \cdot \sin\theta$" and "$\omega \cdot K_e \cdot \cos\theta$" shown in the second term on the right-hand side of eqs. (2) and (3), and outputs these as induced voltage correction values.

Hereinafter, the PTC block 600, the repetitive controller 660, and the FF voltage corrector 640 will be described.

3.1. PTC Block 600

The PTC block 600 includes a feedforward (FF) controller 602, a feedback (FB) FB controller 604, discrete-time operator blocks 606a and 606b, a switch S1, and an adder 608. Each will be described below.

3.1.1. FF Controller 602

The FF controller 602 is a stable inverse model of the plant 102 to be controlled. Based on eq. (5), eqs. (6) and (7) below are obtained.

[math. 5]

$$u_0(k) = B^{-1}(1 - z^{-1}A) x_{ref}(k+1) \qquad (6)$$

$$y_0 = z^{-1} C x_{ref}(k) \qquad (7)$$

The FF controller 602 performs a computation corresponding to eq. (6).

In eqs. (6) and (7), $x_{ref}(k)$ is the value of a command current value on the αβ axes at present, whereas $x_{ref}(k+1)$ is a value which is 1 sampling later in the future. In other words, by utilizing a value of the command which is 1 sampling later in the future, the FF controller 602 obtains an output $u_0(k)$. Stated otherwise, it is after acquiring $x_{ref}(k+1)$ that the FF controller 602 calculates the output $u_0(k)$.

With a transformer not shown, the command current value $x_{ref}(k)$ on the αβ axes is derived through conversion from a command current value on the dq axes that is utilized in vector control of the motor.

When a value of the dq axis command current value which is 1 sampling later in the future is to be converted into a command current value $x_{ref}(k+1)$ on the αβ axes, a future value of electrical angle for performing dq/αβ transformation cannot be obtained. In the case where rotation of the motor 100 is slow, it may be considered that the angular fluctuation during 1 sample is small, and a value (present value) obtained by sampling the electrical angle may be used. On the other hand, when rotation of the motor 100 is fast, the angular fluctuation during 1 sample is large.

Although the PTC block 600 may be designed based on the dq reference frame model, it is known to have a large control error as compared to the αβ reference frame (see, for example, Takahiro NAKAI et al., supra, "Harmonic current suppression for PMSM by repetitive perfect tracking control"-comparison between dq coordinate model and as coordinate model-).

3.1.2. FB Controller 604

Figure 4:
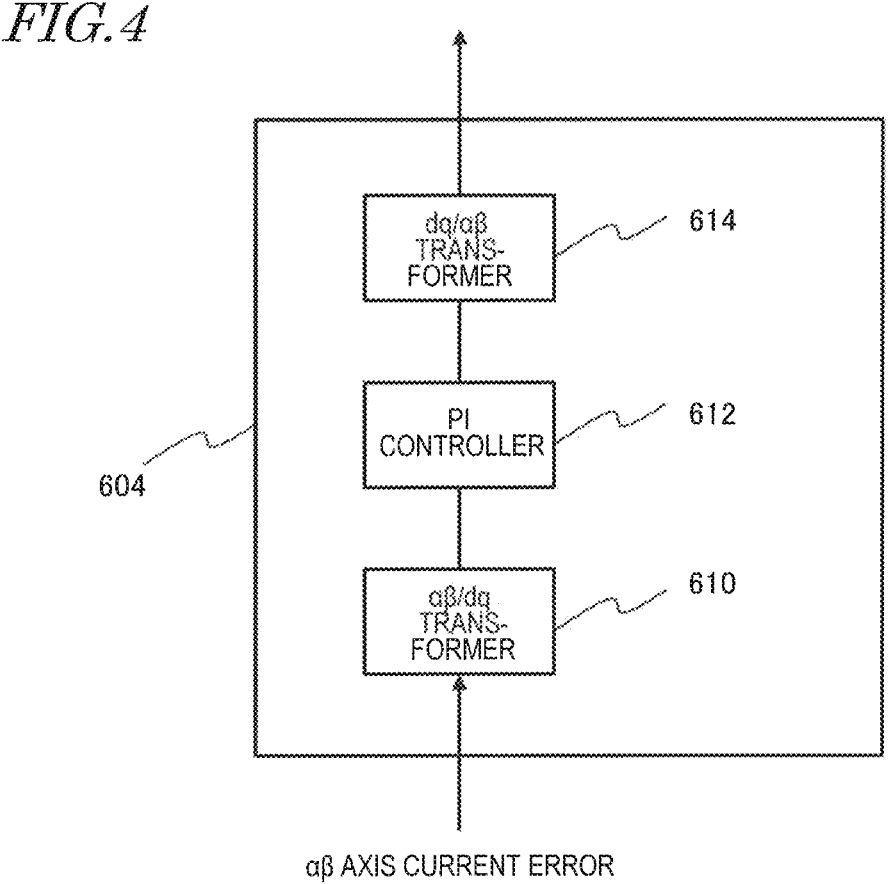
FIG. 4 is a diagram showing an FB controller 604.

FIG. 4 shows the constitution of the FB controller 604. The FB controller 604 includes an as/dq transformer 610, a PI controller 612, and a dq/αβ transformer 614.

The PI controller 612 of the FB controller 604 is designed based on current values of two phases on the dq axes. The reason is that, according to the internal model principle, the PI controller 612 cannot adequately suppress frequency components in the αβ reference frame. For this reason, the αs/dq transformer 610 and the dq/αs transformer 614 are provided in the FB controller 604.

The input to the FB controller 604 is a current error on the α axis and the β axis. To explain more specifically, the input to the FB controller 604 is a difference between an output value $y_0$ from the discrete-time operator block 606a or 606b and a sampled value of currents $i_\alpha$ and $i_\beta$ flowing in the motor 100 being the plant 102, as taken by the sampler 582.

The αβ/dq transformer 610 receives an error (iαe,iβe) of the αβ-axis current, which are on fixed coordinates, and converts this error to a current error (ide,iqe) on the dq axes, which are rotating coordinates. This conversion is known as Park transformation, as expressed by the equations below. Herein, the angle of rotation is designated as θ.

$ide = i\alpha e \cdot \cos\theta + i\beta e \cdot \sin\theta$ $iqe = -i\alpha e \cdot \sin\theta + i\beta e \cdot \cos\theta$ The PI controller 612 is a discretized version of a PI controller in a continuous-time system that is designed according to eq. (8) below.

[math. 6]

$$G_{PI}(s) = K_p + \frac{K_i}{s} \quad (8)$$

Note that how the gains $K_p$, $K_i$ in eq. (8) are designed is related to how the operation of the motor control system 1000 is to be designed. Since the method of gain design for realizing a desired performance is well-known, any specific description thereof is omitted. The PI controller 612 output a voltage value on the dq axes.

The dq/αβ transformer 614 converts the voltage values on the dq axes that are output from the PI controller 612 into voltage values on the αβ axes, and outputs them. This conversion is known as inverse Park transformation. Its mathematical formula is omitted.

3.1.3. Discrete-Time Operator Blocks 606a and 606b and Switch S1

The discrete-time operator block 606a receives a command current value $x_{ref}(k)$ on the αβ axes, and outputs a command voltage value. The discrete-time operator block 606b receives a command current value which is a sum of the command current value $x_{ref}(k)$ on the αβ axes and an output current value from the repetitive controller 660 as described later, and outputs a command voltage value.

The switch S1 effects switching concerning which of the output from the discrete-time operator block 606a and the output from the discrete-time operator block 606b is to be used. The output from the discrete-time operator block 606a is used as an input to a feedback RPTC described later. The output from the discrete-time operator block 606b is used as an input to a feedforward RPTC described later.

If the motor model of the actual motor 100 were accurately established, then perfect tracking control of harmonic currents would be achieved by the PTC block 600 as described above. In actuality, however, a model error will always exist. Therefore, perfect tracking control of harmonic currents cannot be achieved with the PTC block 600 alone.

The motor model (eq. (1)) used for designing the PTC block 600 is a simplified formula, in which higher-order components existing in the actual motor 100, e.g., inductance and magnet flux linkage, are omitted from consideration. The omitted higher-order components will remain as an error between the model that is used for the PTC block 600 and the actual motor, i.e., a so-called model error.

The model error may cause an electrical 6th-order harmonic in the dq-axis current, for example. The PI controller 612 of the FB controller 604 cannot adequately suppress the electrical 6th-order harmonic. Thus, response of harmonic current control admits of improvement.

In order to suppress the electrical 6th-order harmonic, the inventors have adopted the FF voltage corrector 640 and the repetitive controller 660, which will be described next. Note that the 6th-order harmonic will eventually act as a voltage disturbance on the input to the motor 100. Therefore, in the present specification, a model error will be treated as a voltage disturbance.

3.1.4. Adder 608

The adder 608 outputs a sum of the voltage output value u0 from the FF controller 602, the voltage output value from the FB controller 604, the voltage correction value from the induced voltage corrector 620, and an FF voltage correction value from the FF voltage corrector 640 as will be described later. The sum which is output from the adder 608 is sent to the computation block 524 as voltage values $V_\alpha$ and $V_\beta$.

3.2. FF Voltage Corrector 640

The method for addressing the model error may be various.

The present example embodiment adopts a method in which voltage disturbances that are ascribable to spatial harmonic components of inductance and magnet flux linkage are derived by way of mathematical formulae, and a numerically-computed correction factor for voltage disturbance is applied to the motor voltage input in advance, thus suppressing the voltage disturbances. The data concerning inductance and magnet flux linkage for voltage correction may be obtained through a numerical analysis based on the finite element method (FEM), for example.

Voltage disturbances that are ascribable to inductance and magnet flux linkage are derived by way of mathematical formulae. By analyzing the inductance and magnet flux linkage data that is obtained through FEM analysis, the self-inductance, mutual inductance, and magnet flux linkage for each phase are as defined as in eqs. (9), (10) and (11).

[math. 7]

$$\begin{bmatrix} L_u \\ L_v \\ L_w \end{bmatrix} = \begin{bmatrix} \sum_{n=0}^{\infty} L_{2n}\cos\{2n\theta + \theta_{L2n}\} \\ \sum_{n=0}^{\infty} L_{2n}\cos\left\{2n\left(\theta - \frac{2\pi}{3}\right) + \theta_{L2n}\right\} \\ \sum_{n=0}^{\infty} L_{2n}\cos\left\{2n\left(\theta + \frac{2\pi}{3}\right) + \theta_{L2n}\right\} \end{bmatrix} \quad (9)$$

$$\begin{bmatrix} M_{uv} \\ M_{vw} \\ M_{wu} \end{bmatrix} = \begin{bmatrix} \sum_{n=0}^{\infty} M_{2n}\cos\left\{2n\left(\theta + \frac{2\pi}{3}\right) + \theta_{M2n}\right\} \\ \sum_{n=0}^{\infty} M_{2n}\cos\{2n\theta + \theta_{M2n}\} \\ \sum_{n=0}^{\infty} M_{2n}\cos\left\{2n\left(\theta - \frac{2\pi}{3}\right) + \theta_{M2n}\right\} \end{bmatrix} \quad (10)$$

$$\begin{bmatrix} \Psi_{mu} \\ \Psi_{mv} \\ \Psi_{mw} \end{bmatrix} = \begin{bmatrix} \sum_{n=0}^{\infty} \Psi_{m(2n+1)}\cos\{(2n+1)\theta + \theta_{m(2n+1)}\} \\ \sum_{n=0}^{\infty} \Psi_{m(2n+1)}\cos\left\{(2n+1)\left(\theta - \frac{2\pi}{3}\right) + \theta_{m(2n+1)}\right\} \\ \sum_{n=0}^{\infty} \Psi_{m(2n+1)}\cos\left\{(2n+1)\left(\theta + \frac{2\pi}{3}\right) + \theta_{m(2n+1)}\right\} \end{bmatrix} \quad (11)$$

It must be noted that eqs. (9), (10) and (11) differ from the equations that will be found in common textbooks in that phase differences $\theta_{L2n}$, $\theta_{M2n}$, and $\theta_{m(2n+1)}$ exist. The phase differences reflect current dependences of inductance and magnet flux linkage.

Furthermore, a voltage equation for the motor in the UVW reference frame is derived as in eq. (12).

[math. 8]

$$\begin{bmatrix} v_u \\ v_v \\ v_w \end{bmatrix} = R \begin{bmatrix} i_u \\ i_v \\ i_w \end{bmatrix} + \frac{d}{dt}\left( \begin{bmatrix} \Psi_{mu} \\ \Psi_{mv} \\ \Psi_{mw} \end{bmatrix} + \begin{bmatrix} L_u & M_{uv} & M_{wu} \\ M_{uv} & L_v & M_{vw} \\ M_{wu} & M_{vw} & L_w \end{bmatrix} \begin{bmatrix} i_u \\ i_v \\ i_w \end{bmatrix} \right) \quad (12)$$

Three-phase/αβ transformation is applied to eq. (12), whereby eq. (13) is obtained, which is a voltage equation in the αβ reference frame. Inductance and magnet flux linkage are considered up to the 8th order and the 7th order, respectively. This is because, when changed to the dq axes, they will be the 0th order and the 6th order.

Definitions of the various symbols contained in eq. (13) are as follows.

[math. 10]

$$A'_{11} = -2L_4\sin(4\theta + \theta_{L4}) - 4M_4\sin(4\theta + \theta_{M4}) - 6L_6\sin(6\theta + \theta_{L6}) + 6M_6\sin(6\theta + \theta_{M6}) - 4L_8\sin(8\theta + \theta_{L8}) - 8M_8\sin(8\theta + \theta_{M8})$$

$$A'_{12} = A'_{21} = -2L_4\cos(4\theta + \theta_4) - 4M_4\cos(4\theta + \theta_{M4}) + 4L_8\cos(8\theta + \theta_{L8}) + 8M_8\cos(8\theta + \theta_{M8})$$

$$A'_{22} = 2L_4\sin(4\theta + \theta_{L4}) + 4M_4\sin(4\theta + \theta_{M4}) - 6L_6\sin(6\theta + \theta_{L6}) + 6M_6\sin(6\theta + \theta_{M6}) + 4L_8\sin(8\theta + \theta_{L8}) + 8M_8\sin(8\theta + \theta_{M8})$$

$$B'_{11} = \frac{1}{2}\{L_4\cos(4\theta + \theta_{L4}) + 2M_4\cos(4\theta + \theta_{M4}) + 2L_6\cos(6\theta + \theta_{L6}) - 2M_6\cos(6\theta + \theta_{M6}) + L_8\cos(8\theta + \theta_{L8}) + 2M_8\cos(8\theta + \theta_{M8})\}$$

$$B'_{12} = B'_{21} = \frac{1}{2}\{-L_4\sin(4\theta + \theta_{L4}) - 2M_4\sin(4\theta + \theta_{M4}) + L_8\sin(8\theta + \theta_{L8}) + 2M_8\sin(8\theta + \theta_{M8})\}$$

$$B'_{22} = \frac{1}{2}\{-L_4\cos(4\theta + \theta_{L4}) - 2M_4\cos(4\theta + \theta_{M4}) + 2L_6\cos(6\theta + \theta_{L6}) - 2M_6\cos(6\theta + \theta_{M6}) - L_8\cos(8\theta + \theta_{L8}) - 2M_8\cos(8\theta + \theta_{M8})\}$$

$$D'_1 = -\sqrt{\frac{3}{2}}\{5\Psi_{m5}\sin(5\theta + \theta_{m5}) + 7\Psi_{m7}\sin(7\theta + \theta_{m7})\}$$

$$D'_2 = \sqrt{\frac{3}{2}}\{-5\Psi_{m5}\cos(5\theta + \theta_{m5}) + 7\Psi_{m7}\cos(7\theta + \theta_{m7})\}$$

In the inductance matrix of the third term on the right-hand side of eq. (13), $L_0\cos(\theta_{L0}) - M_0\cos(\theta_{M0})$ corresponds to "L" in eq. (1). A "difference term" between eq. (1), which is the ideal model, and eq. (13), which is an actually-derived model of the plant 102, is the voltage disturbances. For convenience of understanding, a drawing with an explicit indication of the "difference term" is provided. FIG. 5 shows a difference term including two kinds of voltage disturbances (a) and (b).

The inventors have conducted a voltage correction so as to cancel out the voltage disturbances (a) and (b). This will be specifically described below.

The voltage disturbances shown in FIG. 5 are canceled out in a manner of applying voltage corrections thereto in advance. By canceling out the voltage disturbances, harmonic disturbances for currents, which exist in current response, are suppressed.

In equation (13), the fourth term ((a1) in FIG. 5) on the right-hand side, is an induced voltage term. The induced voltage is corrected by eqs. (2) and (3).

In equation (13), the fifth, sixth, and seventh terms ((a2) in FIG. 5) on the right-hand side are voltage disturbances

[math. 9]

$$\begin{bmatrix} v_\alpha \\ v_\beta \end{bmatrix} = R\begin{bmatrix} i_\alpha \\ i_\beta \end{bmatrix} + \omega\begin{bmatrix} -L_2\sin(2\theta + \theta_{L2}) - 2M_2\sin(2\theta + \theta_{M2}) & L_2\cos(2\theta + \theta_{L2}) + 2M_2\cos(2\theta + \theta_{M2}) \\ L_2\cos(2\theta + \theta_{L2}) + 2M_2\cos(2\theta + \theta_{M2}) & L_2\sin(2\theta + \theta_{L2}) + 2M_2\sin(2\theta + \theta_{M2}) \end{bmatrix} \quad (13)$$

$$\begin{bmatrix} i_\alpha \\ i_\beta \end{bmatrix} + \begin{bmatrix} L_0\cos(\theta_{L0}) - M_0\cos(\theta_{M0}) + \frac{L_2}{2}\cos(2\theta + \theta_{L2}) + M_2\cos(2\theta + \theta_{M2}) & \frac{L_2}{2}\sin(2\theta + \theta_{L2}) + M_2\sin(2\theta + \theta_{M2}) \\ \frac{L_2}{2}\sin(2\theta + \theta_{L2}) + M_2\sin(2\theta + \theta_{M2}) & L_0\cos(\theta_{L0}) - M_0\cos(\theta_{M0}) - \frac{L_2}{2}\cos(2\theta + \theta_{L2}) - M_2\cos(2\theta + \theta_{M2}) \end{bmatrix}$$

$$\left(\frac{d}{dt}\begin{bmatrix} i_\alpha \\ i_\beta \end{bmatrix}\right) + \sqrt{\frac{3}{2}}\omega\begin{bmatrix} -\Psi_{m1}\sin(\theta + \theta_{m1}) \\ \Psi_{m1}\cos(\theta + \theta_{m1}) \end{bmatrix} + \omega\begin{bmatrix} A'_{11} & A'_{12} \\ A'_{21} & A'_{22} \end{bmatrix}\begin{bmatrix} i_\alpha \\ i_\beta \end{bmatrix} + \begin{bmatrix} B'_{11} & B'_{12} \\ B'_{21} & B'_{22} \end{bmatrix}\left(\frac{d}{dt}\begin{bmatrix} i_\alpha \\ i_\beta \end{bmatrix}\right) + \omega\begin{bmatrix} D'_1 \\ D'_2 \end{bmatrix}$$

due to harmonic components associated with inductance and magnet flux. Voltage disturbances due to the 4th-order, 6th-order, and 8th-order harmonic components correspond to inductance, whereas voltage disturbances due to the 5th-order and 7th-order harmonic component correspond to magnet flux linkage. In order to cancel out the voltage disturbance (a2), the inventors have applied the FF voltage correction process (a) to be described later.

The voltage disturbance (b) is a disturbance which occurs due to saliency. In a non-powered state, the voltage disturbance (b) is smaller in a non-salient type surface permanent magnetic motor (SPM) than in an interior permanent magnetic motor (IPM). However, when a current is flown on the q axis in order to generate torque in a surface permanent magnetic motor (SPM), the magnetic flux will concentrate in the flux path which is traveled by the magnetic flux that is associated with the q-axis current. On the other hand, when a d-axis current is not flown, the flux path on the d axis is vacant. Since inductance is in inverse proportion to magnetoresistance, the inductance is smaller on the q axis, at which magnetic flux concentrates. For these reasons, in motors at large, the voltage disturbance (b) as shown in FIG. 5 exists in eq. (13). In order to cancel out the voltage disturbance (b), the inventors have applied the FF voltage correction process (b) described later.

The mathematical formulae for the FF voltage correction process are indicated in eqs. (14) to (16).

The "voltage disturbance (c)" and the "voltage disturbance (d)" were obtained through conversion from the "voltage disturbance (a)" and the "voltage disturbance (b)" in the αβ reference frame. When the aforementioned condition is satisfied, the second term on the right-hand side in FIG. 6 ((d1) in FIG. 6) has a constant value. Moreover, the third term on the right-hand side ((d2) in FIG. 6) is a zero term. This means that the voltage disturbance (d) is a constant disturbance. As mentioned earlier, the main constituent element of the FB controller 604 is the PI controller 612. Generally speaking, a PI controller is effective for suppression of constant disturbances. Therefore, it is presumable that omission of the FF voltage correction process (b) will not affect the control performance. In this case, the FF voltage corrector 640 outputs the computation result of the FF voltage correction process (a) as the FF voltage correction value.

The FF voltage corrector 640 shown in FIG. 2 performs the aforementioned FF voltage correction processes (a) and (b), or alternatively the FF voltage correction process (a) when the aforementioned condition is satisfied. Specifically, the FF voltage corrector 640 acquires an electrical angular rate ω and an electrical angle θ, and after further obtaining command current values $i_{\alpha ref}(k+1)$ and $i_{\beta ref}(k+1)$ on the αβ axes, performs the computation of eqs. (15) and (16), or the computation of eq. (15). Note that the command current values $i_{\alpha ref}(k+1)$ and $i_{\beta ref}(k+1)$ on the αβ axes indicate

[math. 11]

$$\begin{bmatrix} v_{acom} \\ v_{bcom} \end{bmatrix} = \begin{bmatrix} v_{acom1} \\ v_{bcom1} \end{bmatrix} + \begin{bmatrix} v_{acom2} \\ v_{bcom2} \end{bmatrix} \quad (14)$$

$$\begin{bmatrix} v_{acom1} \\ v_{bcom1} \end{bmatrix} = +\omega \begin{bmatrix} A'_{11} & A'_{12} \\ A'_{21} & A'_{22} \end{bmatrix} \begin{bmatrix} i_{\alpha ref}(k+1) \\ i_{\beta ref}(k+1) \end{bmatrix} + \begin{bmatrix} B'_{11} & B'_{12} \\ B'_{21} & B'_{22} \end{bmatrix} \left( \frac{d}{dt} \begin{bmatrix} i_{\alpha ref}(k+1) \\ i_{\beta ref}(k+1) \end{bmatrix} \right) + \omega \begin{bmatrix} D'_1 \\ D'_2 \end{bmatrix} \quad (15)$$

$$\begin{bmatrix} v_{acom2} \\ v_{bcom2} \end{bmatrix} = \omega \begin{bmatrix} -L_2\sin(2\theta+\theta_{L2}) - 2M_2\sin(2\theta+\theta_{M2}) & L_2\cos(2\theta+\theta_{L2}) + 2M_2\cos(2\theta+\theta_{M2}) \\ L_2\cos(2\theta+\theta_{L2}) + 2M_2\cos(2\theta+\theta_{M2}) & L_2\sin(2\theta+\theta_{L2}) + 2M_2\sin(2\theta+\theta_{M2}) \end{bmatrix} \begin{bmatrix} i_{\alpha ref}(k+1) \\ i_{\beta ref}(k+1) \end{bmatrix} + \quad (16)$$

$$\begin{bmatrix} \frac{L_2}{2}\cos(2\theta+\theta_{L2}) + M_2\cos(2\theta+\theta_{M2}) & \frac{L_2}{2}\sin(2\theta+\theta_{L2}) + M_2\sin(2\theta+\theta_{M2}) \\ \frac{L_2}{2}\sin(2\theta+\theta_{L2}) + M_2\sin(2\theta+\theta_{M2}) & -\frac{L_2}{2}\cos(2\theta+\theta_{L2}) - M_2\cos(2\theta+\theta_{M2}) \end{bmatrix} \left( \frac{d}{dt} \begin{bmatrix} i_{\alpha ref}(k+1) \\ i_{\beta ref}(k+1) \end{bmatrix} \right)$$

The left-hand side of eq. (14) represents a comprehensive voltage correction value. In the present specification, this correction value is referred to as an "FF voltage correction value". In eq. (14), the first term and the second term on the right-hand side respectively represent computation formulae of FF voltage correction processes (a) and (b) in the αβ reference frame. In other words, the FF voltage correction process (a) is a process that performs the computation of eq. (15). The FF voltage correction process (b) is a process that performs the computation of eq. (16). By using the FF voltage correction processes (a) and (b) in combination, the FF voltage correction value is generated, and is allowed to be reflected in the output of the computation block 522. As a result of this, voltage disturbances are suppressed.

Note that performing the FF voltage correction process (b) is not essential; in some cases, it may suffice to only perform the FF voltage correction process (a). An example of this is when the condition that the current in the dq reference frame is a DC current and that the motor 100 rotates with a constant speed is satisfied.

FIG. 6 shows a voltage equation for the dq reference frame and voltage disturbances that are contained in the voltage equation.

values of the command current which are 1 sampling later in the future, as in the case of the FF controller 602.

The FF voltage correction processes (a) and (b) performed by the FF voltage corrector 640 are computations of eqs. (15) and (16). As the FF voltage corrector 640, for example, a semiconductor integrated circuit such as a CPU (central processing unit) or a GPU (graphics processing unit) may be used.

In FIG. 2, the FF voltage corrector 640 receives the command current values $i_{\alpha reflect}$ and $i_{\beta reflect}$ which have not been subjected to repetitive learning/correction. However, the FF voltage corrector 640 may alternatively use a command current value that has been subjected to repetitive learning/correction which is output from the repetitive controller 660. The broken arrow in FIG. 2 indicates that a command current value that has been subjected to repetitive learning/correction is transmitted to the FF voltage corrector 640.

3.4. Repetitive Controller 660

First, the reason why the repetitive controller 660 is provided in the present disclosure will be described.

Regarding the FF voltage correction processes (a) and (b) to be performed by the aforementioned induced voltage corrector 640, the inventors acquired, through an FEM analysis in advance, the respective values of inductance and magnet flux of each order needed for the FF voltage correction.

However, the data of inductance and magnet flux linkage as obtained through an FEM analysis may not necessarily match those of the actual motor. Therefore, the designed FF voltage correction may be inadequate, such that voltage disturbances may not be completely corrected. Furthermore, it is assumed that the electrical angle has a constant value between samples for the digital control during FEM analysis. Moreover, an error may occur between any calculated value of trigonometric functions, as are frequently used in the FF voltage correction processes (a) and (b), and the actual value. These assumption and errors may affect the efficacy of the FF voltage correction. Therefore, the inventors have considered introducing the repetitive controller 660 to enhance the efficacy of the FF voltage correction.

The fundamental operation of the repetitive controller 660 is: learning periodic disturbances; and correcting a command value based on the learning result. By introducing the repetitive controller 660, the inventors have successfully suppressed current harmonics that undergo periodically changes, such current harmonics remaining after the FF voltage correction processes.

Repetitive control was conceived based on the internal model principle (IMP). As indicated in eq. (17), a signal having an arbitrary period T is denoted as $G_R(j\omega)$. Eq. (18) expresses $G_R(s)$, which is a representation of $G_R(j\omega)$ in the s domain.

[math. 12]

$$G_R(j\omega) = \cos \omega T - j \sin \omega T \quad (17)$$

$$G_R(s) = e^{-Ts} \quad (18)$$

According to eq. (18), the arbitrary period signal can be expressed with a dead time factor causing the output to be lagged by time T.

Figure 7A:
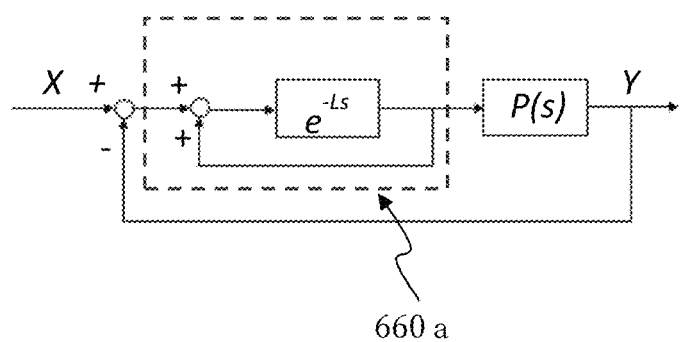
FIG. 7A is a diagram showing a repetitive controller 660a of a continuous-time system, in which a dead time factor is incorporated in a closed loop.

When a signal X having a fixed period T is to be tracked based on the internal model principle, a dead time factor as indicated in eq. (18) may be incorporated in the closed loop. FIG. 7A shows the fundamental constitution of a repetitive controller 660a of a continuous-time system, in which a dead time factor is incorporated in a closed loop. A plant to be controlled is denoted as P(s).

By discretizing eq. (18) based on z=exp(sTu), eq. (19) is obtained.

[math. 13]

$$G_R(z) = z^{-Nd} \quad (19)$$

Figure 7B:
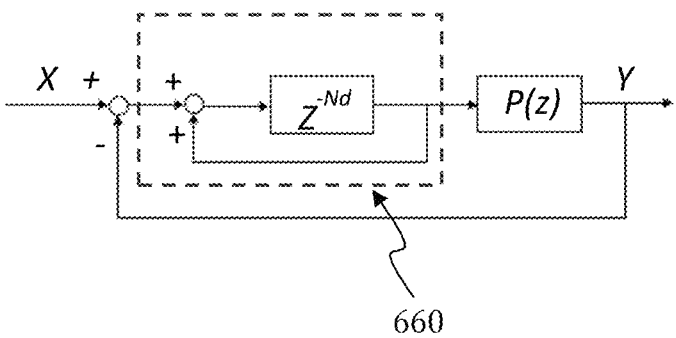
FIG. 7B is a diagram showing the repetitive controller 660 (discrete-time system) according to an illustrative example embodiment of the present disclosure.

FIG. 7B shows the repetitive controller 660 (discrete-time system) according to the present example embodiment.

Tu is a control cycle, where Nd=T/Tu. Nd may be referred to as the "number of memory stages".

Next, the repetitive controller 660 will be described more specifically.

When the PTC block 600 and the repetitive controller 660 are combined, they are called repetitive perfect tracking control (RPTC). There exist two types of repetitive perfect tracking control, i.e., a feedforward type RPTC (FF_RPTC) and a feedback type RPTC (FB_RPTC). FF_RPTC is an off-line method of command correction, whereas FB_RPTC is an on-line method of command correction. The latter is said to be more robust than the former. It is known however that, when the plant 102 to be controlled has large fluctuations, FB_RPTC may be unstable.

The switches S1 and S3 in FIG. 2 are used in order to switch between the aforementioned FF_RPTC and FB_RPTC. The switch S2 in FIG. 2 is also used for the switching. Specifically, this is as follows.

During FF_RPTC, the switch S1 may be connected to the discrete-time operator block 606b, and the switch S2 may be turned OFF and the switch S3 turned ON. In this state, the repetitive controller 660 learns periodic current disturbances. Thereafter, the switch S3 may be turned OFF and the switch S2 turned ON, whereby the learned periodic current disturbances are fed forward to the command, thus correcting the command.

During FB_RPTC, the switch S1 may be connected to the discrete-time operator block 606a, and both switches S2 and S3 may be turned ON. In this state, while the repetitive controller 660 learns periodic current disturbances, the learned periodic current disturbances are fed back to the command, thereby correcting the command.

The timing of turning ON the switch S3 as aforementioned should be after the current response has taken a steady state. If the switch S3 is turned ON in a transient state, the repetitive controller 660 will learn a difference between the command current and the current response in a transient state, so that the learned difference between the command current and the current response in a transient state will be fed back to the command value. This will, conversely, apply an error to the command value. Therefore, in order to ensure that learning is begun after the current response has taken a steady state, the timing with which to turn the switch S3 ON is important.

The current deviations that have been learned by the repetitive controller 660 include aperiodic disturbances, noises associated with sensors, and so on. In the case where repetitive control is used, the following may be additionally performed: aperiodic disturbances may be reduced by using a mean filter; sensor noises may be removed by using a Q filter; and so on.

The choice between FF_RPTC and FB_RPTC may be made de-pending on the application. For example, in the case where robustness of the motor control system 1000 is regarded as important, FB_RPTC may be selected. On the other hand, when stability of the motor control system 1000 is regarded as important, FF_RPTC may be selected.

4. Operation of the Control Device 500

Figure 8:
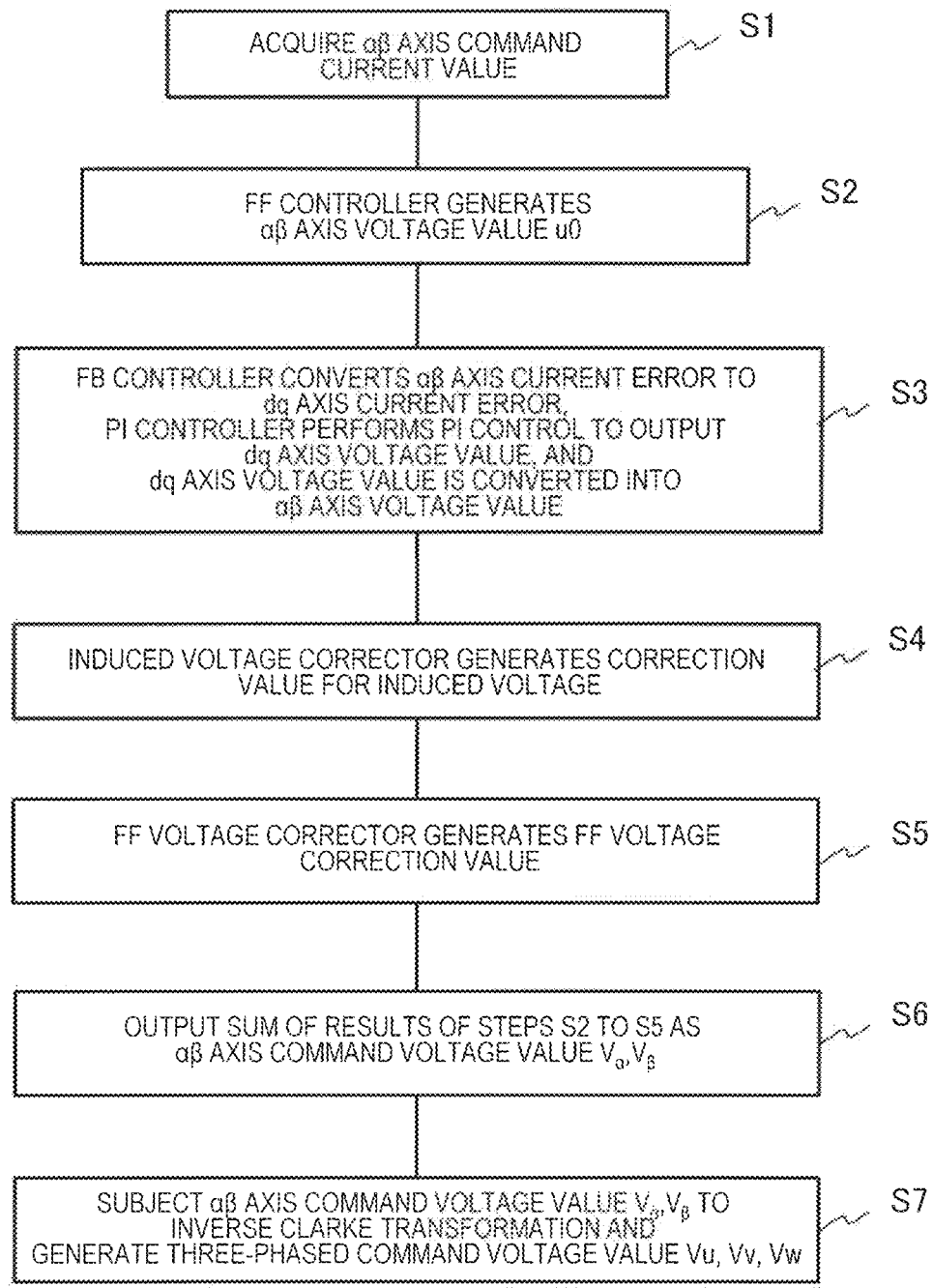
FIG. 8 is a flowchart showing the procedure of processes performed by the control device 500.

FIG. 8 is a flowchart showing the procedure of processes by the control device 500. The control device 500 repetitively executes the processes of FIG. 8, and in each iteration outputs a command voltage value Vu, Vv, Vw to control rotation of the motor 100.

At step S1, the control device 500 acquires an αβ axis command current value.

At step S2, the FF controller 602 of the control device 500 generates an αβ axis voltage value u0 from the αβ axis command current value.

At step S3, the αβ/dq transformer 610 of the FB controller 604 converts the αβ axis current error into a dq axis current error, and outputs it to the PI controller 612. The PI controller 612 performs PI control to generate a dq axis voltage value from the dq axis current error value, and outputs it to the dq/αβ transformer 614. The dq/αβ transformer 614 converts the dq axis voltage value into an αβ axis voltage value.

At step S4, the induced voltage corrector 620 of the control device 500 generates a correction value for induced voltage based on eqs. (2) and (3).

At step S5, the FF voltage corrector 640 of the control device 500 performs the computations from eq. (14) to eq. (16) to generate an FF voltage correction value.

At step S6, the adder 608 of the control device 500 adds the results of steps S2 to S5, and outputs the resultant sum as an αβ axis command voltage value $V_\alpha, V_\beta$.

At step S7, the computation block 524 of the control device 500 subjects the αβ axis command voltage value $V_\alpha, V_\beta$ to inverse Clarke transformation, thereby generating a three-phased command voltage value Vu, Vv, Vw.

Through the above procedure, the control device 500 is able to supply the three-phased command voltage value Vu, Vv, Vw to the inverter 300.

5. Simulation Results

Figure 9:
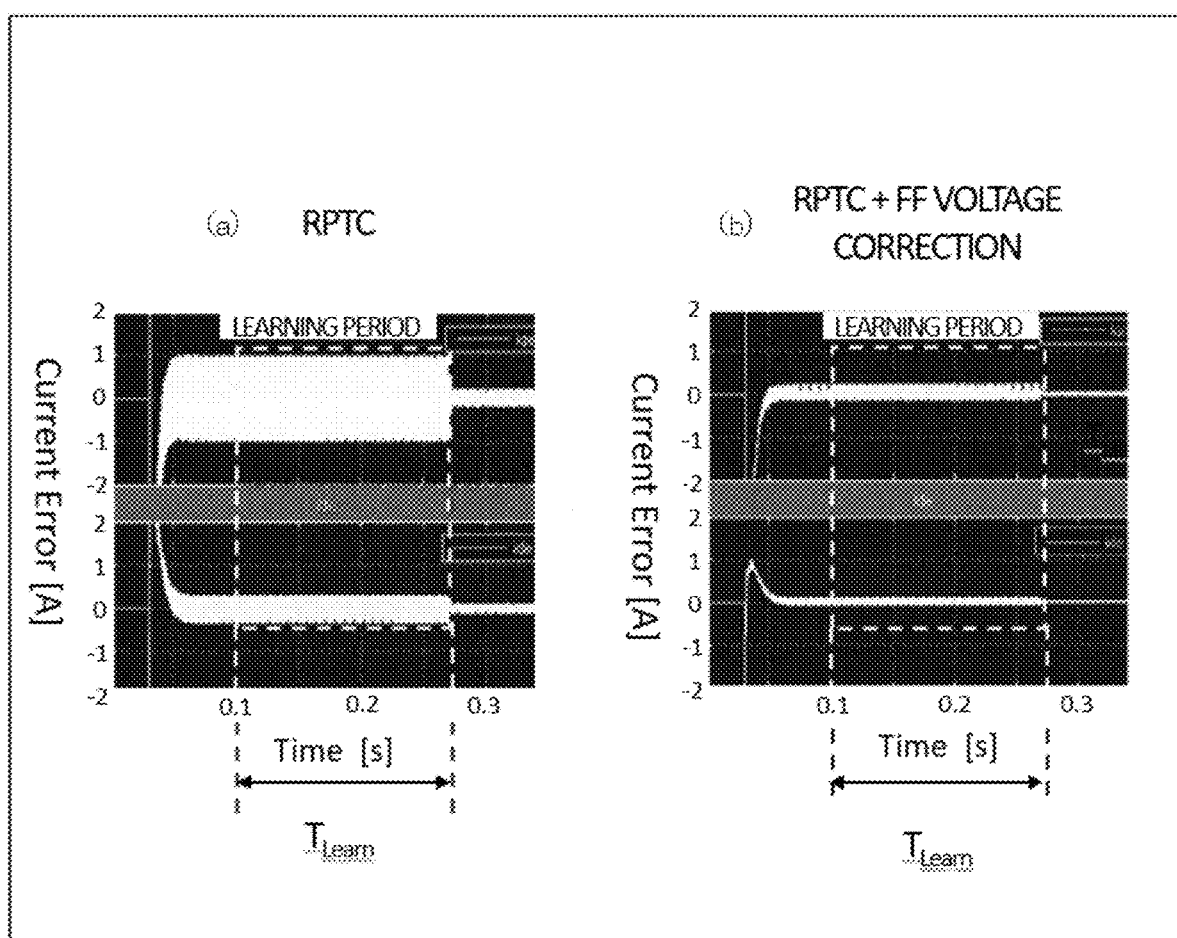
FIG. 9 is a diagram showing simulation results.

The inventors have conducted a simulation. FIG. 9 shows the simulation results. In FIG. 9, (a) represents a difference between the dq axis command current value and the current response when FF voltage correction is not performed; and (b) represents a difference between the dq axis command current value and the current response when FF voltage correction is performed. The learning period is denoted as "TLearn".

In (b) of FIG. 9, the model error is corrected by the FF voltage correction process during the learning period TLearn, whereby the difference between the command current value and the current response is reduced. On the other hand, in (a) of FIG. 9, the same difference as that before beginning the learning still continues to exist during the learning period TLearn.

Pay attention to after the lapse of the learning period TLearn. In (b) of FIG. 9, the difference is further reduced from the difference during the learning period TLearn. On the other hand, in (a) of FIG. 9, the difference is reduced after the lapse of the learning period TLearn, but the difference is greater than the difference shown in (b) of FIG. 9.

Thus, when the FF voltage correction process is performed, the difference between the command current value and the current response is smaller than when the FF voltage correction process is not performed. Therefore, it has been confirmed that, by performing the FF voltage correction process, a current control with a higher precision is achieved.

A non-limiting, illustrative example embodiment according to the present disclosure has been described.

The above description is also applicable to contexts other than controlling motor rotation. For example, the above description is applicable to controlling an actuator which is used for driving the head of a hard disk drive. Harmonic currents may be used for controlling such an actuator. Therefore, by applying the control method according to the present disclosure, a current can be made to track a harmonic current command with a good precision.

Alternatively, the above description may be applicable to controlling an atomic force microscope. For example, in an atomic force microscope, a laser diode may be used in order to optically measure minute displacements of a cantilever. In order to reduce the noises generated from the laser diode (LD), a high frequency current superposition technique is utilized where light from the LD is driven with high-frequency modulation by applying a high-frequency current of 300 to 500 MHz to the LD. Therefore, the control method according to the present disclosure will allow the current to track the harmonic current command with a good precision.

The present disclosure is applicable to applications where control for allowing a current to track a harmonic current command with a good precision is performed.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device that outputs a command voltage value, the control device comprising:
    a feedback controller to perform feedback control based on a current value, and output a first voltage value;
    a feedforward controller established by using an inverse model of a plant as a controlled object;
    a feedforward voltage corrector to correct a voltage disturbance that occurs due to a modeling error between the plant and a model of the plant;
    a repetitive controller to learn periodic current disturbances; and
    a switch to control input/output to the repetitive controller; wherein
    the switch is turned ON when a current response is in a steady state;
    the repetitive controller learns the current disturbances and corrects a command current value;
    the feedback controller outputs the first voltage value by performing the feedback control based on a current value that is acquired from the corrected command current value;
    the feedforward controller inputs the corrected command current value to the inverse model to generate a second voltage value; and
    a sum of the first voltage value and the second voltage value is output as the command voltage value.

2. The control device of claim 1, wherein the feedforward voltage corrector corrects a voltage disturbance caused by a harmonic component occurring due to the modeling error between the plant and the model of the plant.

3. The control device of claim 2, wherein
    the feedforward voltage corrector outputs a third voltage value; and
    a sum of the first voltage value, the second voltage value, and the third voltage value is output as the command voltage value.

4. The control device of claim 3, wherein
    the plant includes a permanent magnet synchronous motor; and
    the feedforward voltage corrector calculates the third voltage value based on an electrical angular rate and an electrical angle of the permanent magnet synchronous motor, and the command current value.

5. The control device of claim 3, wherein
    the plant includes a permanent magnet synchronous motor; and
    the feedforward voltage corrector calculates the third voltage value based on an electrical angular rate and an electrical angle of the permanent magnet synchronous motor, and the corrected command current value.

6. The control device of claim 4, further comprising an induced voltage corrector to perform voltage correction based on the electrical angular rate, the electrical angle, and an induced voltage constant; wherein
    the induced voltage corrector outputs a fourth voltage value; and
    a sum of the first voltage value, the second voltage value, and the fourth voltage value is output as the command voltage value.

7. The control device of claim 6, wherein the induced voltage corrector performs voltage correction in an αβ reference frame.

8. The control device of claim 7, wherein, the feedback controller further includes:

a first transformer to convert a current value on αβ axes to a current value on dq axes for use in the feedback control; and a second transformer to convert a voltage value on the dq axes as obtained from the feedback control into a voltage value on the αβ axes;

the harmonic component occurs due to inductance and magnet flux of the permanent magnet synchronous motor; and the feedforward voltage corrector corrects the harmonic component as a voltage disturbance in an αβ reference frame.

9. The control device of claim 8, wherein the permanent magnet synchronous motor includes:

a rotor; and a stator core including a magnet inside.

10. The control device of claim 5, further comprising an induced voltage corrector to perform voltage correction based on the electrical angular rate, the electrical angle, and an induced voltage constant; wherein the induced voltage corrector outputs a fourth voltage value; and a sum of the first voltage value, the second voltage value, and the fourth voltage value is output as the command voltage value.

11. The control device of claim 10, wherein the induced voltage corrector performs voltage correction in an αβ reference frame.

12. The control device of claim 11, wherein the feedback controller further includes:

a first transformer to convert a current value on αβ axes to a current value on dq axes for use in the feedback control; and a second transformer to convert a voltage value on the dq axes as obtained from the feedback control into a voltage value on the αβ axes;

the harmonic component occurs due to inductance and magnet flux of the permanent magnet synchronous motor; and the feedforward voltage corrector corrects the harmonic component as a voltage disturbance in an αβ reference frame.

13. The control device of claim 12, wherein the permanent magnet synchronous motor includes:

a rotor; and a stator core including a magnet inside.

14. The control device of claim 2, wherein the plant includes a permanent magnet synchronous motor;

the feedback controller further includes:

a first transformer to convert a current value on αβ axes to a current value on dq axes for use in the feedback control; and a second transformer to convert a voltage value on the dq axes as obtained from the feedback control into a voltage value on the αβ axes;

the harmonic component occurs due to inductance and magnet flux of the permanent magnet synchronous motor; and the feedforward voltage corrector corrects the harmonic component as a voltage disturbance in an αβ reference frame.

15. The control device of claim 14, wherein the permanent magnet synchronous motor includes:

a rotor; and a stator core including a magnet inside.

* * * * *